United States Patent
Mehmedovic et al.

(10) Patent No.: US 11,852,146 B2
(45) Date of Patent: Dec. 26, 2023

(54) PUMP HOUSING DEVICE FOR A FLUID PUMP, AND A FLUID PUMP

(71) Applicant: Velcora Holding AB, Arsta (SE)

(72) Inventors: Rifet Mehmedovic, Tumba (SE);
Pedram Azadrad, Tullinge (SE);
Henrik Nedlich, Sundbyberg (SE);
Poul Anton Daugaard, Kolding (DK);
Jesper Raabjerg Jensen, Middelfart (DK)

(73) Assignee: Velcora Holding AB, Arsta (SE)

( * ) Notice: Subject to any disclaimer, the term of this patent is extended or adjusted under 35 U.S.C. 154(b) by 450 days.

(21) Appl. No.: 17/046,377

(22) PCT Filed: Apr. 9, 2019

(86) PCT No.: PCT/SE2019/050327
§ 371 (c)(1),
(2) Date: Oct. 9, 2020

(87) PCT Pub. No.: WO2019/199222
PCT Pub. Date: Oct. 17, 2019

(65) Prior Publication Data
US 2021/0156395 A1   May 27, 2021

(30) Foreign Application Priority Data
Apr. 11, 2018   (SE) .................... 1850406-8

(51) Int. Cl.
*F04D 29/42*   (2006.01)
*F04D 29/12*   (2006.01)
*F16J 15/34*   (2006.01)

(52) U.S. Cl.
CPC ......... *F04D 29/426* (2013.01); *F04D 29/126* (2013.01); *F16J 15/3404* (2013.01)

(58) Field of Classification Search
CPC .... F04D 26/126; F04D 26/426; F16J 15/3404
See application file for complete search history.

(56) References Cited

U.S. PATENT DOCUMENTS

| | | | |
|---|---|---|---|
| 4,538,959 A | 9/1985 | Cantor et al. | |
| 5,195,867 A * | 3/1993 | Stirling | ............... F04D 29/128 415/111 |

(Continued)

FOREIGN PATENT DOCUMENTS

| | | |
|---|---|---|
| CN | 2091373 U | 12/1991 |
| CN | 2559815 Y | 7/2003 |

(Continued)

OTHER PUBLICATIONS

International Search Report and Written Opinion for corresponding International Application No. PCT/SE2019/050327 dated Jul. 10, 2019.

(Continued)

*Primary Examiner* — Justin D Seabe
*Assistant Examiner* — Aye S Htay
(74) *Attorney, Agent, or Firm* — Renner, Otto, Boisselle & Sklar

(57) ABSTRACT

A pump housing device for a fluid pump comprises a rear wall element comprising a rear surface turned towards an impeller. The rear wall element comprises an opening defining a cylindrical surface along a longitudinal central axis. The opening receives a rotating drive shaft of the impeller. A static seal element has a plane seal surface that seals against a plane seal surface of a rotary seal element mounted to the drive shaft and rotating with the drive shaft. The plane seal surface of the static seal element is turned away from the rear surface. One or more grooves extend through the rear wall element and through the rear surface and the (Continued)

cylindrical surface. Each groove has a bottom line that extends from the rear surface to the cylindrical surface.

14 Claims, 3 Drawing Sheets

(56) References Cited

U.S. PATENT DOCUMENTS

| | | | |
|---|---|---|---|
| 5,336,048 A | | 8/1994 | Ganzon |
| 5,489,187 A | * | 2/1996 | Ray .................. F04D 29/2266 415/111 |
| 5,591,001 A | * | 1/1997 | Ray .................. B01F 25/64 261/DIG. 71 |
| 5,713,719 A | * | 2/1998 | Fiore .................. F04D 29/426 415/113 |
| 6,053,500 A | * | 4/2000 | Fondelius ............ F16J 15/3404 277/408 |
| 6,428,011 B1 | | 8/2002 | Oskouei et al. |
| 7,112,033 B1 | * | 9/2006 | Holdorf ................ F04D 29/128 415/113 |
| 2004/0136826 A1 | * | 7/2004 | Britt .................. F01D 1/02 415/206 |
| 2005/0134002 A1 | | 6/2005 | Elliott |
| 2005/0147491 A1 | | 7/2005 | Loyd |
| 2010/0254840 A1 | * | 10/2010 | Nedlich ............... F16J 15/38 277/358 |

FOREIGN PATENT DOCUMENTS

| | | |
|---|---|---|
| CN | 2709686 Y | 7/2005 |
| CN | 201517507 U | 6/2010 |
| CN | 201517507 U | 6/2010 |
| CN | 103307019 | 9/2013 |
| JP | 2004132426 | 4/2004 |
| WO | 2008136757 | 11/2008 |

OTHER PUBLICATIONS

First Chinese Office Action dated Jan. 7, 2022, for corresponding Chinese Patent Application No. 201980025150.9.
Examination Report for Corresponding Indian National Stage Application No. 202027040893, dated Apr. 19, 2022.

* cited by examiner

PUMP HOUSING DEVICE FOR A FLUID PUMP, AND A FLUID PUMP

This application is a national phase of International Patent Application No. PCT/SE2019/050327 filed Apr. 9, 2019, which claims priority to Swedish Patent Application No. 1850406-8 filed on Apr. 11, 2018, all of which are hereby incorporated herein by reference.

TECHNICAL FIELD OF THE INVENTION

The present invention refers generally to the technical field of fluid pumps, especially fluid pumps to be used in the food industry and the like, where the hygienic requirements are high or even very high.

More specifically, the present invention refers to a pump housing device for a fluid pump for transporting a fluid, comprising a rear wall element comprising a rear surface configured to be turned towards an impeller of the fluid pump, wherein the rear wall element comprises an opening, which defines a cylindrical surface and extends along a longitudinal central axis and wherein the opening is configured to receive a drive shaft of the impeller to rotate around the longitudinal central axis, and a static seal element having a plane seal surface configured to seal against a plane seal surface of a rotary seal element configured to be mounted to the drive shaft and to rotate with the drive shaft around the longitudinal central axis.

The present invention also refers to a fluid pump.

BACKGROUND OF THE INVENTION AND PRIOR ART

One problem with fluid pumps to be used in the food industry and the like is that food, microorganisms and other particles can collect in various cavities and pockets in the fluid pump, especially in the area of the static and rotary seal elements located in and/or at the opening through the rear wall of the pump housing. If not properly removed, such collections may contaminate the fluids to be transported by the fluid pump.

US 2004/0136826 discloses a fluid pump including provisions for cooling and/or flushing in the vicinity of a static seal. In one embodiment, an open channel fluid passageway is defined on a generally flat surface of a pump housing. A centrifugal rotor with a generally flat backplate rotates proximate a surface of the housing. The fluid passageways are adapted and configured to have a pathway that includes a directional component parallel to the direction of rotation, such that fluid drag from the rotating backplate induces flow within the passageway. The passages of the exit can be positioned such that flow exiting the passageway is at least partly tangential to the seal and/or the seal housing.

US 2005/0147491 discloses a centrifugal pump having a pump case and a rotatable impeller disposed within the pump case. A central aperture is defined within the rearward wall of the pump case to facilitate the connection of an impeller drive shaft to the impeller. A drive shaft seal is disposed within the central aperture to seal the impeller drive shaft to the pump case. At least one or more grooves are defined in the rearward wall of the pump case to carry liquids to and from the drive shaft seal. One or more radial ridges are disposed on the rearward side of the impeller to encourage liquids to flow within the grooves to and from the drive shaft seal to continuously wash away precipitates around the seal and to cool the seal.

SUMMARY OF THE INVENTION

The purpose of the present invention is to overcome the disadvantages discussed above. In particular, the purpose is to improve the hygienic properties of the fluid pump and to improve the fluid flow in cavities and pockets in the fluid pump in the area of the static and rotary seal elements.

This purpose is achieved by the pump housing device initially defined, which is characterized in that the plane seal surface of the static seal element is turned away from the rear surface, and one or more grooves extend through the rear wall element and through the rear surface and the cylindrical surface, wherein each of said one or more grooves has a bottom line that extends from the rear surface to the cylindrical surface.

The one or more grooves, which may enable easy mounting and demounting of the rear wall element, contribute to an improved fluid flow to and from an area including a gap formed between the static seal element and the drive shaft/impeller. Each groove extending from the rear surface to the cylindrical surface induces a fluid flow outwardly towards the pump housing and the impeller.

By arranging the plane seal surface of the static seal element to be turned away from the rear surface, i.e. the static seal element is provided between the impeller and the rotary seal element, a so called external seal pressurized internally arrangement is obtained in contrast to a so called internal seal pressurized externally arrangement shown in the prior art discussed above. The advantage of the claimed arrangement is that the cavity for the sealing may lie on a small diameter, which results in an improved efficiency and less return flow from a high pressure to a low pressure. By the claimed arrangement, a secure lubrication of the plane seal surfaces is obtained, since a small quantity of the rotating fluid that is pumped may, by means of the centrifugal forces, be present between the plane seal surface. However, the claimed arrangement is more difficult to keep clean, but this cleaning problem is solved by the defined one or more grooves.

According to an embodiment of the invention, each of said one or more grooves has, in relation to the fluid that is caused to rotate by the impeller, an upstream edge at the rear surface and a downstream edge at the rear surface. A low pressure may be formed at the upstream edge and a high pressure may be formed at the downstream edge. This pressure difference may induce and promote the fluid flow in the grooves.

According to an embodiment of the invention, the bottom line forms an angle of inclination to the longitudinal central axis, wherein the angle of inclination may be at least 20° and most 70°, especially along its length from the rear surface to the cylindrical surface. The angle of inclination may preferably be at least 30°, more preferably at least 40°. The angle of inclination may preferably be at most 60° and more preferably at most 50°. For instance the angle of inclination may be 45° or approximately 45°.

According to an embodiment of the invention, the bottom line is straight or substantially straight, especially along its length from the rear surface to the cylindrical surface.

According to another embodiment of the invention, the bottom line is curved, especially along its length from the rear surface to the cylindrical surface. Even if the bottom line is curved it may form an angle of inclination to the longitudinal central axis along its length from the rear surface to the cylindrical surface. The bottom line may be convexly or concavely curved, especially along its length from the rear surface to the cylindrical surface.

According to an embodiment of the invention, each of the grooves has a bottom surface and two opposite side surfaces adjoining the bottom surface. The upstream edge is formed between one of the side surfaces on the one hand and the rear and cylindrical surfaces on the other hand. The downstream edge is formed between the other of the side surfaces on the one hand and the rear and cylindrical surfaces on the other hand.

According to an embodiment of the invention, the bottom surface is curved, in particular concavely curved, at least when seen in a cross-sectional plane being perpendicular to the bottom line. The curved bottom surface may have a constant radius. Such a bottom surface may be easy to produce, for instance by means of a milling tool.

According to an embodiment of the invention, the opposite side surfaces are parallel with each other. The side surfaces may be plane.

According to an embodiment of the invention, the rear surface is plane or substantially plane. Preferably, the rear surface of the rear wall element and a rear surface of a rear wall of the pump housing are plane or substantially plane and aligned with each other.

According to an embodiment of the invention, the static seal element has a back surface opposite to the plane seal surface of the static seal element, wherein said one or more grooves end at an end position between the back surface and the rear surface.

According to an embodiment of the invention, said end position is located more closely to the back surface than to the rear surface, in order to utilize the full possible length of the grooves for promoting the fluid flow. Said end position may advantageously be located at the rear surface of the static seal element. The grooves may thus extend to the static seal element, especially to the back surface of the static seal element.

According to an embodiment of the invention, the bottom line extends radially when seen in the direction of the longitudinal central axis.

According to an embodiment of the invention, the bottom line is inclined in relation to a radial line when seen in the direction of the longitudinal central axis. For instance, the bottom line of the grooves may be inclined in the same direction in relation to the respective radial line, or may be alternately positively and negatively inclined in relation to the respective radial line.

According to an embodiment of the invention, the static seal element has an outer cylindrical surface being engaged by the cylindrical surface of the opening.

According to an embodiment of the invention, the rear wall element comprises an outer threaded surface that is configured to be in engagement with a threaded hole through a rear wall of a pump housing of the fluid pump. The rear wall element, with the static seal element, may thus be easily mounted to and demounted from the rear wall of the pump housing.

The purpose is also achieved by the fluid pump initially defined, which comprises a pump housing, an impeller in the pump housing and a pump housing device as defined above.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS

Figure 1:
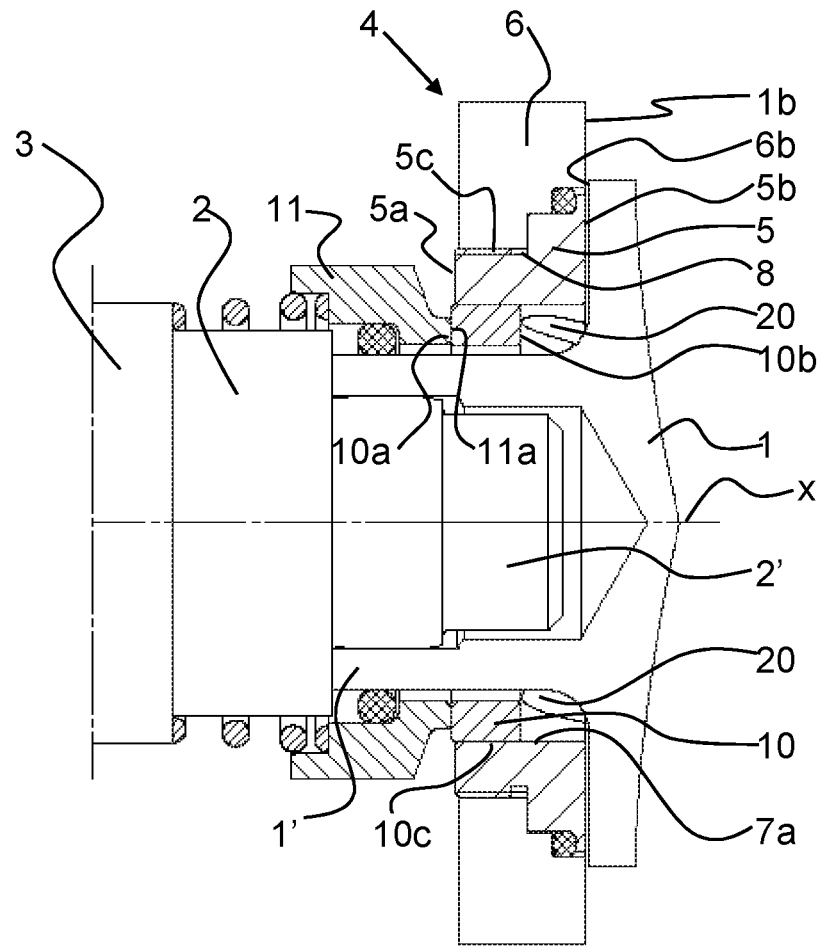
FIG. 1 discloses schematically a sectional view of a part of a fluid pump.

FIG. 1 discloses a part of a fluid pump for transporting a fluid. The fluid pump comprises an impeller 1 mounted to a drive shaft 2 driven by a drive motor 3. The impeller 1 is provided in a pump housing 4 of the fluid pump. Only parts of the pump housing 4 and the impeller 1 are disclosed in FIG. 1. The pump housing 4 receives a pump housing device that comprises a rear wall element 5.

The rear wall element 5 of the pump housing device comprises a rear surface 5b that is turned towards a back surface 1b of the impeller 1. The rear surface 5b is plane or substantially plane and may be aligned with a rear surface 6b of a rear wall 6 of the pump housing 4.

The rear wall element 5 comprises an opening 7 which defines a cylindrical surface 7a and extends along a longitudinal central axis x through the rear wall element 5. The longitudinal central axis x also forms the rotary axis of the drive shaft 2. The opening 7 is configured to receive the drive shaft 2 of the impeller 1 to permit the drive shaft 2 and the impeller 1 to rotate around the longitudinal central axis x.

The rear wall element 5 comprises an outer threaded surface 5c that is configured to be in engagement with an at least partly threaded hole 8 through the rear wall 6 of the pump housing 4 of the fluid pump.

A static seal element 10 is attached to the rear wall element 5. The static seal element 10 has an outer cylindrical surface 10c that is engaged by the cylindrical surface 7a of the opening 7, preferably through shrink fit.

A rotary seal element 11 is mounted to the drive shaft 2 to rotate with the drive shaft 2 around the longitudinal central axis x.

As can be seen in FIG. 1, the impeller 1 has a cylindrical shaft portion 1' which extends rearwardly towards the drive motor 3 and has a central recess receiving a front end 2' of the drive shaft 2. The front end 2' may be in treaded engagement with the central recess of the cylindrical portion 1' of the impeller 1.

An outer cylindrical surface of the cylindrical portion 1' is aligned with an outer surface of the drive shaft 2 rearwardly of the front end 2', as can be seen in FIG. 1.

In the embodiments disclosed, the rotary seal element 11 is provided radially outside the cylindrical portion 1' of the impeller 1. The static seal element 10 has a plane seal surface 10a that seals against a plane seal surface 11a of the rotary seal element 11. The static seal element 10 and the rotary seal element 11 forms a mechanical sealing.

The plane seal surface 10a of the static seal element 10 is turned away from the rear surface 5b and from the back surface 1b of the impeller 1. The static seal element 10 has a back surface 10b opposite to the plane seal surface 10a. The back surface 10b may be parallel with the plane seal surface 10a.

One or more grooves 20, in the first embodiment six grooves 20, extend through the rear wall element 5 and through the rear surface 5b and the cylindrical surface 7a. Each of the grooves 20 has a bottom line 21 that extends all the way from the rear surface 5b to the cylindrical surface 7a, see FIG. 3.

Figure 3:
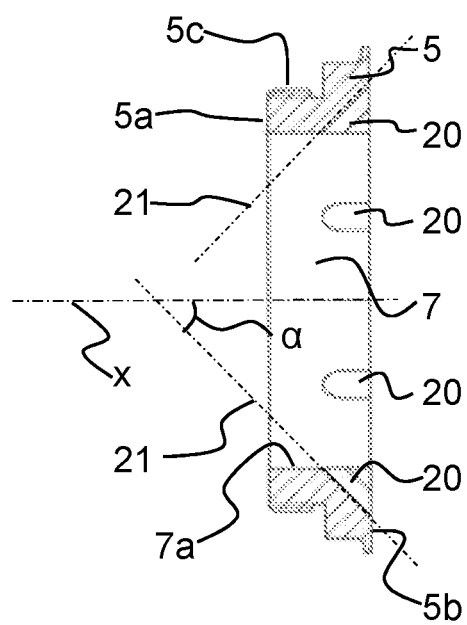
FIG. 3 discloses schematically a sectional view of the rear wall element along the line III-Ill in FIG. 2.

The bottom line 21 may form an angle α of inclination to the longitudinal central axis x, see FIG. 3. The angle α of inclination may be at least 20°, preferably at least 30°, more preferably at least 40°. The angle α of inclination may be at most 70°, preferably at most 60° and more preferably at most 50°. For instance, the angle α of inclination may be 45° or approximately 45°.

In the first embodiment, the bottom line 21 is substantially straight.

Figure 4:
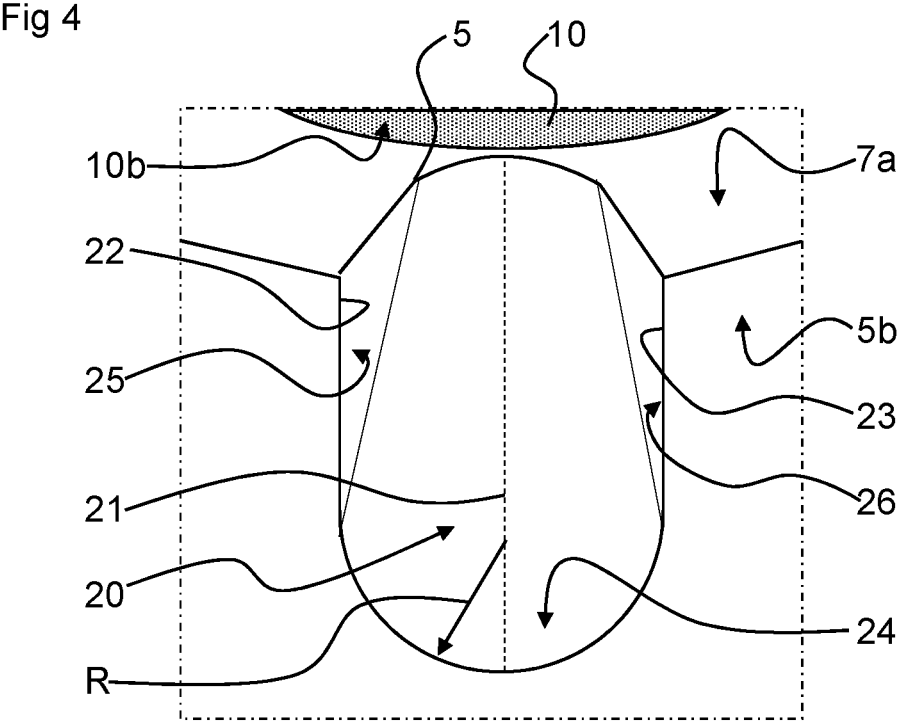
FIG. 4 discloses schematically a perspective front view of a groove in the rear wall element in FIGS. 2 and 3.

Each of the grooves 20 has, in relation to the fluid that is caused to rotate by the impeller 1, an upstream edge 22 at the rear surface 5b and a downstream edge 23 at the rear surface 5b, see FIG. 4.

Furthermore, each of the grooves 20 has a bottom surface 24 and two opposite side surfaces 25 and 26 adjoining the bottom surface 24. The bottom surface 24 is concavely curved when seen in a cross sectional plane being perpendicular to the bottom line 21 and the longitudinal central axis x as is schematically illustrated in FIG. 4. In the first embodiment, the bottom surface 24 has a radius R when seen in a cross sectional plane located at the rear surface 5a. However, the bottom surface 24 may be curved, or concavely curved, but lack any constant radius.

The opposite side surfaces 25 and 26 may be parallel with each other. Furthermore, the opposite side surfaces 25 and 26 may be plane or substantially plane.

Each of the grooves 20 ends at an end position between the back surface 10b of the static seal element 10 and the rear surface 5b. In the embodiments disclosed, said end position is located more closely to the back surface 10b than to the rear surface 5b. Preferably, said end position may be located at the back surface 10b as is indicated in FIGS. 1 and 4.

Figure 2:
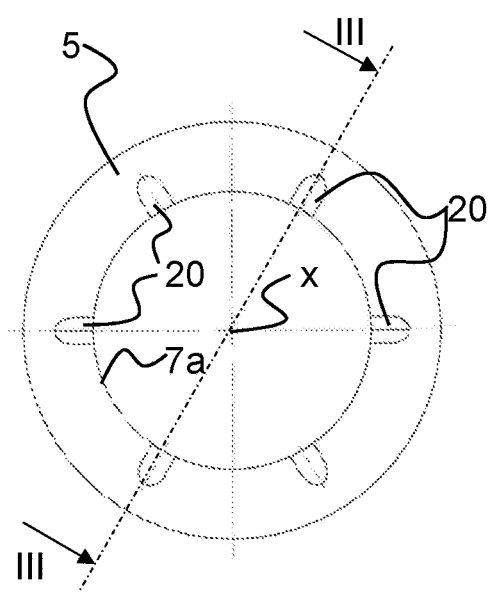
FIG. 2 discloses schematically a front view of rear wall element of a pump housing device of the fluid pump according to a first embodiment of the invention.

In the first embodiment, the bottom line 21 of the groove 20 extends radially when seen in the direction of the longitudinal central axis x, as is illustrated in particular in FIG. 2. In other words, the bottom line 21 of each groove 20, or more precisely an extrapolation of the bottom line 21, intersects the longitudinal central axis x.

Figure 5:
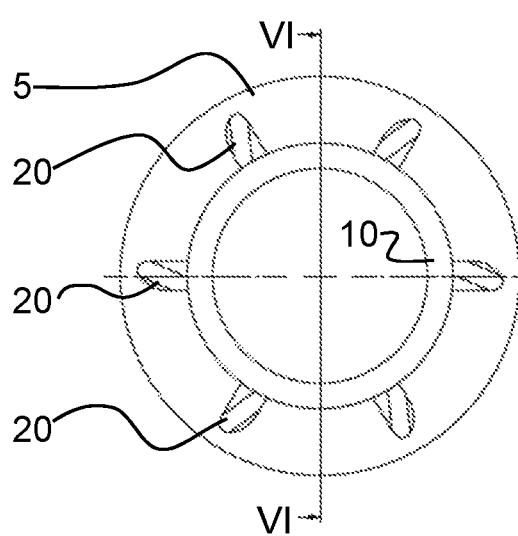
FIG. 5 discloses schematically a front view of rear wall element of the pump housing device of the fluid pump according to a second embodiment of the invention.
Figure 6:
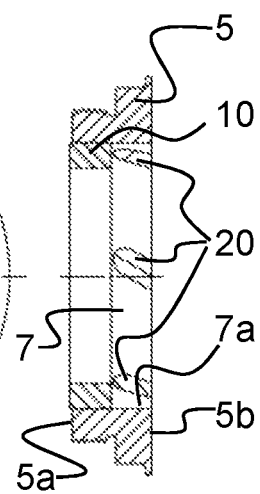
FIG. 6 discloses schematically a sectional view of the rear wall element along the line VI-VI in FIG. 5.

FIGS. 5 and 6 disclose a second embodiment which differs from the first embodiment in that the bottom line 21 of the groove 20 is inclined in relation to a radial line when seen in the direction of the longitudinal central axis x. In the second embodiment, the bottom line 21 of each groove 20 is inclined in the same direction in relation to a respective radial line.

In a variant of the second embodiment, the bottom line 21 of every second groove 20 is positively inclined in relation to a radial line and the other grooves 20 are negatively inclined in relation to a respective radial line.

Figure 7:
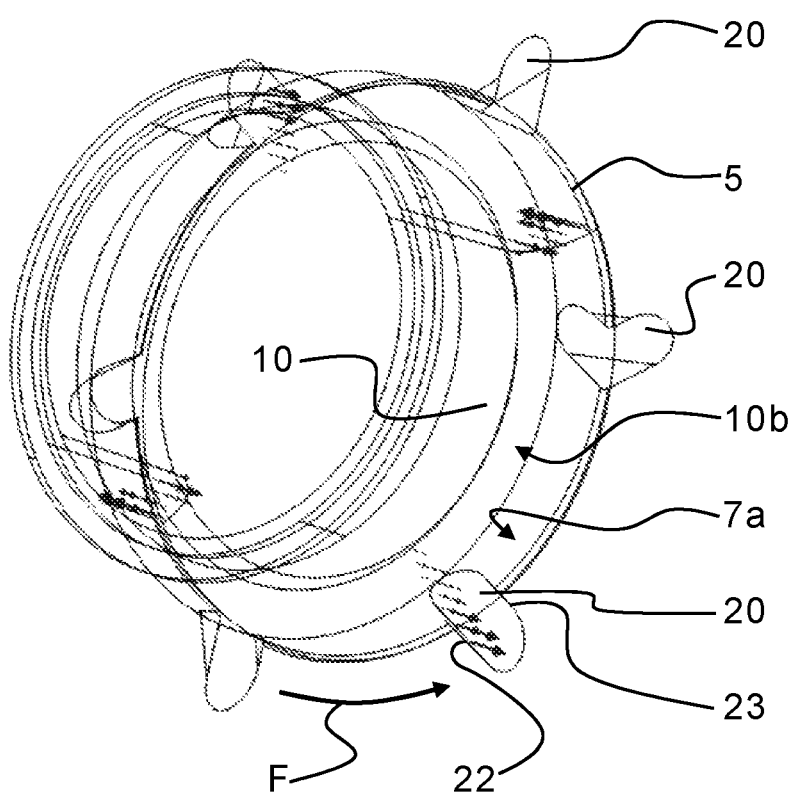
FIG. 7 discloses schematically a perspective view of the rear wall element in FIG. 2 with flow patterns.

As is illustrated in FIG. 7, the impeller 1 generates a rotating flow F in the direction of the arrow. The rotating flow F creates a low pressure at the upstream edge 22 and a high pressure at the downstream edge 23 of each groove 20. This pressure difference induces and promotes a fluid flow in the grooves 20, especially a flow outwardly towards the impeller 1 as is indicated by the larger axial arrows in the grooves 20. Fluid may flow inwardly in the gap between the drive shaft 2, or cylindrical portion 1', and the cylindrical surface 7a of the opening 7 as is indicated by the larger axial arrows between the grooves 20.

The inward and outward flow ensures a proper and efficient flushing and cleaning of the area between the static and rotary seal elements 10, 11 and the drive shaft 2.

It should be emphasized that the number of grooves 20 may be less than six, for instance 1, 2, 3, 4 or 5, or more than six, for instance 7, 8, 9, 10 etc.

The present invention is not limited to the embodiments disclosed but may be varied and modified within the scope of the following claims.

The invention claimed is:

1. A pump housing device for a fluid pump for transporting a fluid, comprising
a rear wall element comprising a rear surface configured to be turned towards an impeller of the fluid pump, wherein the rear wall element comprises an opening, which defines a cylindrical surface and extends along a longitudinal central axis and wherein the opening is configured to receive a drive shaft of the impeller to rotate around the longitudinal central axis, and
a static seal element having a plane seal surface configured to seal against a plane seal surface of a rotary seal element configured to be mounted to the drive shaft and to rotate with the drive shaft around the longitudinal central axis, wherein:
the plane seal surface of the static seal element is turned away from the rear surface, and
one or more grooves extend through the rear wall element and through the rear surface and the cylindrical surface, and
wherein each of said one or more grooves has a bottom line that extends from the rear surface to the cylindrical surface;
wherein the static seal element has an outer cylindrical surface being in direct contact engagement with the cylindrical surface of the opening.

2. The pump housing according to claim 1, wherein each of said one or more grooves has, in relation to the fluid that is caused to rotate by the impeller, an upstream edge at the rear surface and a downstream edge at the rear surface.

3. The pump housing device according to the pump housing device according to wherein the bottom line forms an angle of inclination to the longitudinal central axis, and wherein the angle of inclination is at least 20° and most 70°.

4. The pump housing device according to claim 1, wherein the bottom line is substantially straight.

5. The pump housing device according to claim 1, wherein each of the grooves has a bottom surface and two opposite side surfaces adjoining the bottom surface.

6. The pump housing device according to claim 5, wherein the bottom surface is curved at least when seen in a cross-sectional plane being perpendicular to the bottom line.

7. The pump housing device according to claim 5, wherein the opposite side surfaces are parallel with each other.

8. The pump housing device according to claim 1, wherein the rear surface is substantially plane.

9. The pump housing device according to claim 1, wherein the static seal element has a back surface opposite to the plane seal surface of the static seal element, wherein said one or more grooves end at an end position between the back surface and the rear surface.

10. The pump housing device according to claim 9, wherein said end position is located more closely to the back surface than to the rear surface.

11. The pump housing device according to claim 1, wherein the bottom line extends radially when seen in the direction of the longitudinal central axis.

12. The pump housing device according to claim 1, wherein the bottom line is inclined in relation to a radial line when seen in the direction of the longitudinal central axis.

13. The pump housing device according to claim 1, wherein the rear wall element comprises an outer threaded surface that is configured to be in engagement with a threaded hole through a rear wall of a pump housing of the fluid pump.

14. A fluid pump comprising a pump housing, an impeller in the pump housing and a pump housing device according to claim 1.

* * * * *